(12) United States Patent
Lin (10) Patent No.: US 8,306,351 B2
(45) Date of Patent: Nov. 6, 2012

(54) APPARATUS AND METHOD FOR FILTERING NOISE IN IMAGE SIGNAL

(75) Inventor: Hsin-I Lin, Yilan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 909 days.

(21) Appl. No.: 12/403,345

(22) Filed: Mar. 12, 2009

(65) Prior Publication Data

US 2010/0040181 A1 Feb. 18, 2010

(30) Foreign Application Priority Data

Aug. 15, 2008 (TW) .............................. 97131226 A (51) Int. Cl.
*G06K 9/40* (2006.01)
(52) U.S. Cl. ........ 382/260; 382/261; 382/262; 382/263; 382/264; 382/265; 382/266; 382/232; 348/342; 348/663; 348/665; 348/835
(58) Field of Classification Search .......... 382/260–275, 382/232; 348/342, 663, 665, 835
See application file for complete search history.

(56) References Cited

U.S. PATENT DOCUMENTS

| 5,225,078 | A | | 7/1993 | Polasky et al. |
| 5,263,094 | A | * | 11/1993 | Laitinen et al. ............... 382/152 |
| 5,293,225 | A | * | 3/1994 | Nishiyama et al. ........... 348/242 |
| 5,446,500 | A | | 8/1995 | Harford |
| 5,712,807 | A | * | 1/1998 | Bangham ...................... 708/300 |
| 6,122,332 | A | | 9/2000 | Ogata et al. |
| 6,163,517 | A | * | 12/2000 | Kim et al. .................. 369/59.21 |
| 6,795,559 | B1 | | 9/2004 | Taura et al. |
| 2001/0019633 | A1 | * | 9/2001 | Tenze et al. ................... 382/261 |
| 2004/0125236 | A1 | * | 7/2004 | Kempf .......................... 348/700 |
| 2006/0158366 | A1 | * | 7/2006 | Kim .............................. 341/155 |

OTHER PUBLICATIONS

Generalized—structures, Karakos et al., IEEE, 1057-7149, 1997, pp. 1038-1045.*
Generalized-structures, Karakos et al., I EEE, 1057-7149, 1997, pp. 1038-1045.*

* cited by examiner

*Primary Examiner* — Jayesh A Patel
(74) *Attorney, Agent, or Firm* — Jianq Chyun IP Office (57) ABSTRACT

An apparatus and a method for filtering noise in an image signal are provided. The apparatus includes an analog-to-digital converter (ADC), a first filter, and a second filter. The ADC receives the image signal and converts the image signal into a digital signal. The first filter receives the digital signal and filters a first noise portion of the digital signal to generate a first signal. The second filter coupled to the first filter receives the first signal and filters a second noise portion of the first signal, wherein the first noise portion is a sampled-based impulse noise, and the second noise portion is a line-based impulse noise.

21 Claims, 7 Drawing Sheets

APPARATUS AND METHOD FOR FILTERING NOISE IN IMAGE SIGNAL

CROSS-REFERENCE TO RELATED APPLICATION

This application claims the priority benefit of Taiwan application serial no. 97131226, filed on Aug. 15, 2008. The entirety of the above-mentioned patent application is hereby incorporated by reference herein and made a part of specification.

BACKGROUND OF THE INVENTION

1. Field of the Invention

The present invention generally relates to an apparatus for filtering noise in a signal, and more particularly, to an apparatus for filtering sample-based impulse noise and line-based impulse noise in a signal.

2. Description of Related Art

Generally speaking, noise (for example, impulse noise) is usually carried by a signal when the signal is transmitted or converted in a video device. However, signal distortion may be caused by such noise and accordingly the image outputted from the video device may be distorted as well.

Conventionally, impulse noise in a signal is usually filtered out through a nullity method or a limit method. The nullity method is to reduce a signal to null when an impulse noise is detected in the signal, so as to reduce the affection of the impulse noise. In addition, the limit method is to limit a signal within a specific range when an impulse noise is detected in the signal, so as to reduce the affection of the impulse noise.

Impulse noise in a signal can be effectively filtered out through foregoing methods. However, an impulse noise further includes a short impulse noise and a long impulse noise. Because the long impulse noise exists for a longer time, if foregoing methods are adopted for filtering the long impulse noise, the characteristic of the signal itself may be changed as well (i.e., the signal containing the long impulse noise is also nullified or limited), and accordingly image distortion may be caused. Besides, if the impulse noise interferes with a timing signal of a video image and cannot be filtered effectively at a receiving end, the image outputted from the video device will be seriously distorted.

SUMMARY OF THE INVENTION

Accordingly, the present invention is directed to an apparatus and a method for filtering noise in an image signal, wherein a sample-based impulse noise and a line-based impulse noise in a digital signal can be filtered effectively and accordingly the quality of the digital signal can be improved.

The present invention provides an apparatus for filtering noise in an image signal. The apparatus includes an analog-to-digital converter (ADC), a first filter, and a second filter. The ADC receives an image signal and converts the image signal into a digital signal. The first filter receives the digital signal and filters a first noise portion of the digital signal to generate a first signal. The second filter coupled to the first filter receives the first signal and filters a second noise portion of the first signal, wherein the first noise portion is a sample-based impulse noise, and the second noise portion is a line-based impulse noise.

According to an embodiment of the present invention, the first filter inspects the digital signal to generate a first inspection result, generates a compensation signal according to the digital signal, and determines the first signal to be the compensation signal or the digital signal according to the first inspection result.

According to an embodiment of the present invention, the second filter inspects the first signal to generate a second inspection result and determines a first output signal to be the delayed first signal or a median of the delayed first signal according to the second inspection result.

The present invention provides a method for filtering noise in an image signal. The method includes following steps. First, an image signal is received and converted into a digital signal. Then, a first noise portion of the digital signal is filtered to generate a first signal. Next, a second noise portion of the first signal is filtered, wherein the first noise portion is a sample-based impulse noise, and the second noise portion is a line-based impulse noise.

According to an embodiment of the present invention, the step of filtering the first noise portion of the digital signal includes following steps. First, the digital signal is inspected to generate a first inspection result. Then, a compensation signal is generated according to the digital signal. Next, the first signal is determined to be the compensation signal or the digital signal according to the first inspection result.

According to an embodiment of the present invention, the step of filtering the second noise portion of the first signal includes following steps. First, the first signal is inspected to generate a second inspection result. Then, a first output signal is determined to be the delayed first signal or a median of the delayed first signal according to the second inspection result.

In the present invention, a first noise portion (sample-based impulse noise) and a second noise portion (line-based impulse noise) of a digital signal are respectively filtered by a first filter and a second filter. Thereby, the quality of the digital signal can be effectively improved and signal distortion in subsequent signal processing carried out by a next-level circuit can be avoided.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
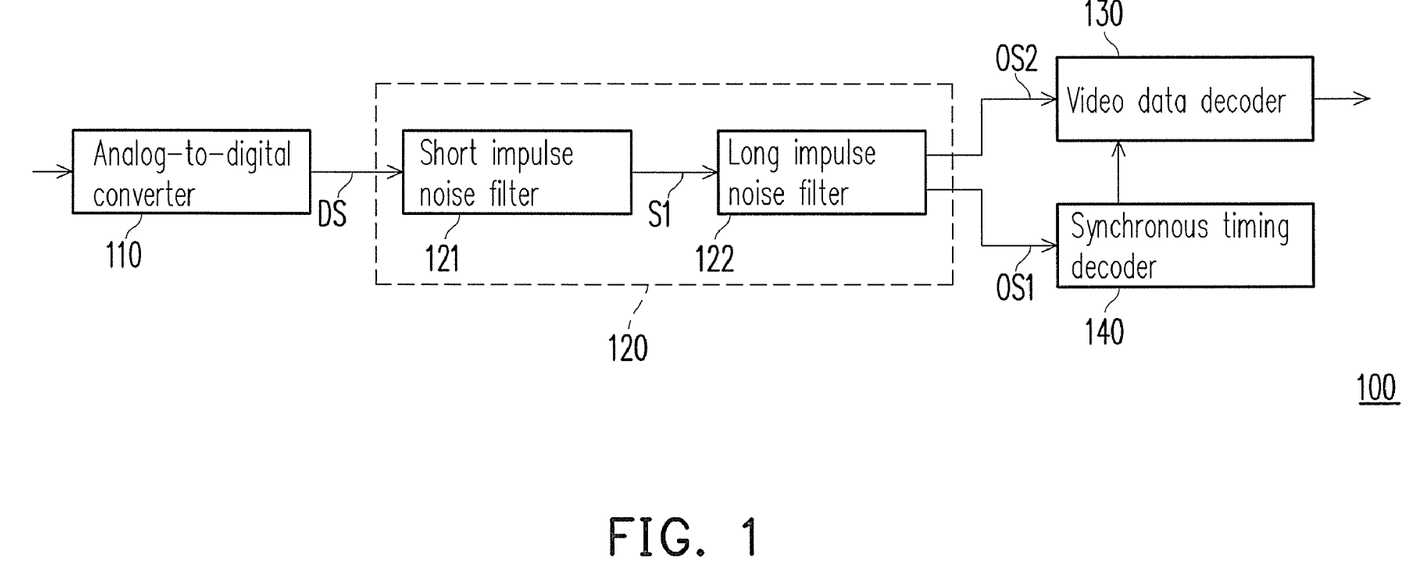
FIG. 1 is a block diagram of a video device according to an embodiment of the present invention.

FIG. 1 is a block diagram of a video device according to an embodiment of the present invention. Referring to FIG. 1, the video device 100 includes an analog-to-digital converter (ADC) 110, a signal noise filter device 120, a video data decoder 130, and a synchronous timing decoder 140. The ADC 110 receives an analog signal (for example, an analog video signal or an analog radio frequency signal) and converts the analog signal into a digital signal DS.

The signal noise filter device 120 coupled to the ADC 110 includes a short impulse noise filter 121 and a long impulse noise filter 122. The short impulse noise filter 121 receives the digital signal DS and filters a first noise portion of the digital signal DS to generate a signal S1. The long impulse noise filter 122 coupled to the short impulse noise filter 121 receives the signal S1 and filters a second noise portion of the signal S1. In the present embodiment, the first noise portion is a sample-based impulse noise (i.e., a short impulse noise), and the second noise portion is a line-based impulse noise (i.e., a long impulse noise).

Below, the short impulse noise filter 121 and the long impulse noise filter 122 will be respectively described in order to allow those skilled in the art to understand how the short impulse noise filter 121 and the long impulse noise filter 122 respectively filter out the first noise portion and the second noise portion of the digital signal DS.

Figure 2:
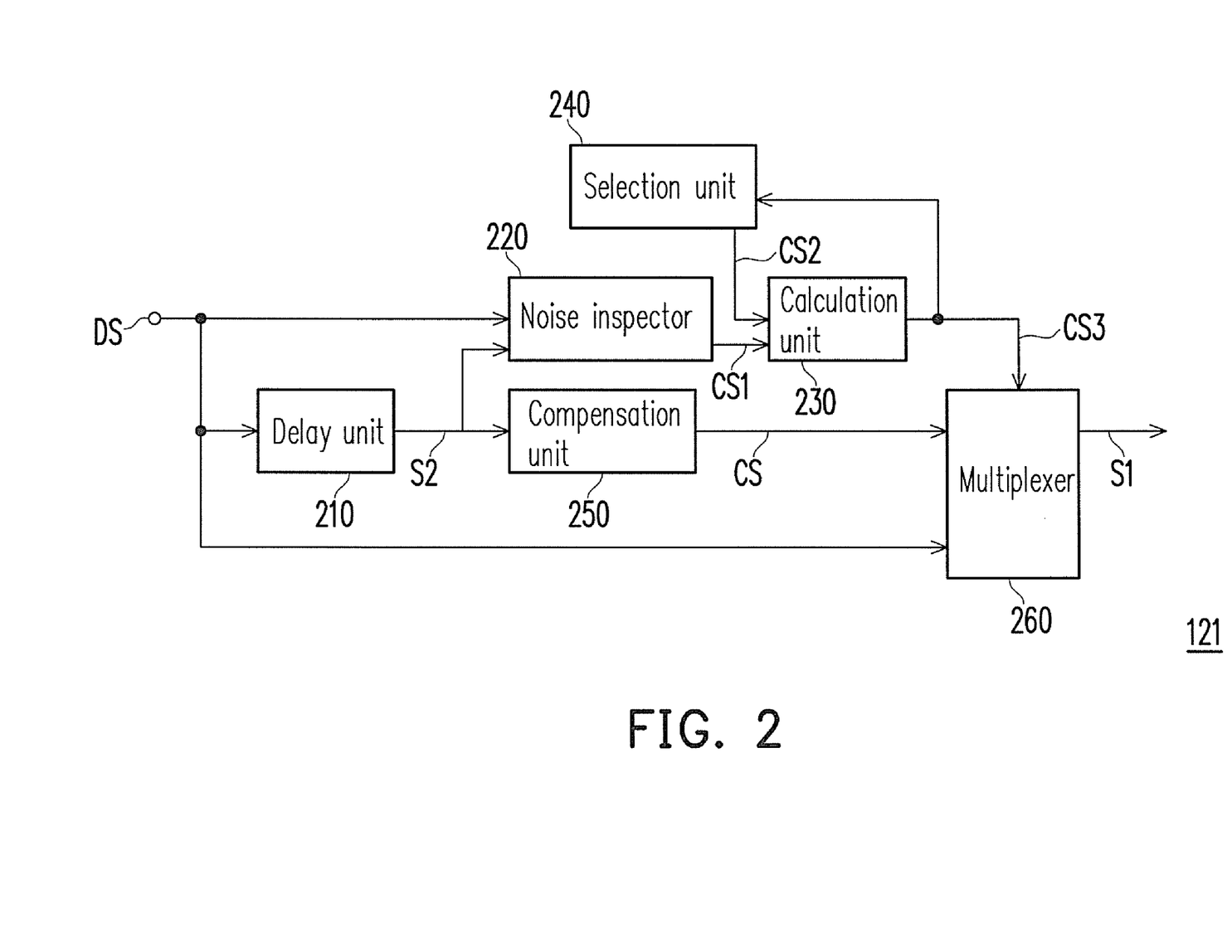
FIG. 2 is a block diagram illustrating an implementation of a short impulse noise filter 121 in FIG. 1.

FIG. 2 is a block diagram illustrating an implementation of the short impulse noise filter 121 in FIG. 1. Referring to FIG. 2, the short impulse noise filter 121 includes a delay unit 210, a noise inspector 220, a calculation unit 230, a selection unit 240, a compensation unit 250, and a multiplexer 260.

The delay unit 210 receives and delays the digital signal DS to generate a signal S2 (i.e., the previous digital signal). The noise inspector 220 coupled to the delay unit 210 receives and inspects the digital signal DS and the signal S2 to generate a control signal CS1. In other words, if there is a deviation between the digital signal DS and the signal S2, namely, the digital signal DS contains noise, the control signal CS1 is asserted; and if there is no deviation between the digital signal DS and the signal S2, namely, the digital signal DS does not contain any noise, the control signal CS1 is de-asserted.

The calculation unit 230 coupled to the noise inspector 220 receives the control signal CS1 and a control signal CS2 and performs a calculation on the control signals CS1 and CS2 to generate a control signal CS3. In the present embodiment, the calculation unit 230 may be an AND gate, and the operation pattern thereof may be: only asserting the control signal CS3 when the control signals CS1 and CS2 are both asserted; and de-asserting the control signal CS3 when the control signals CS1 and CS2 are both de-asserted, the control signal CS1 is de-asserted and the control signal CS2 is asserted, or the control signal CS1 is asserted and the control signal CS2 is de-asserted.

Referring to FIG. 2 again, the selection unit 240 coupled to the calculation unit 230 determines whether to assert the control signal CS2 according to the state of the control signal CS3. The compensation unit 250 coupled to the delay unit 210 compensates the signal S2 to generate a compensation signal CS. In the present embodiment, the selection unit 240 sets a window such that the short impulse noise filter 121 can operate (compensate signal) within this specific window.

The multiplexer 260 is coupled to the compensation unit 250 and the calculation unit 230. The multiplexer 260 selects one of the digital signal DS and the compensation signal CS as the signal S1 according to the state of the control signal CS3. For example, the multiplexer 260 selects the digital signal DS as the signal S1 when the control signal CS3 is asserted (no sample-based impulse noise is detected in the digital signal DS), and the multiplexer 260 selects the compensation signal CS as the signal S1 when the control signal CS3 is de-asserted (a sample-based impulse noise is detected in the digital signal DS). As described above, if the short impulse noise filter 121 detects that the digital signal DS contains a sample-based impulse noise, the short impulse noise filter 121 compensates the digital signal DS through the compensation unit 250 thereof and outputs the compensated signal CS. On the other hand, if the short impulse noise filter 121 detects that the digital signal DS contains no sample-based impulse noise, the short impulse noise filter 121 directly outputs (bypasses) the digital signal DS so as to avoid incorrect compensation of the digital signal DS.

Figure 3:
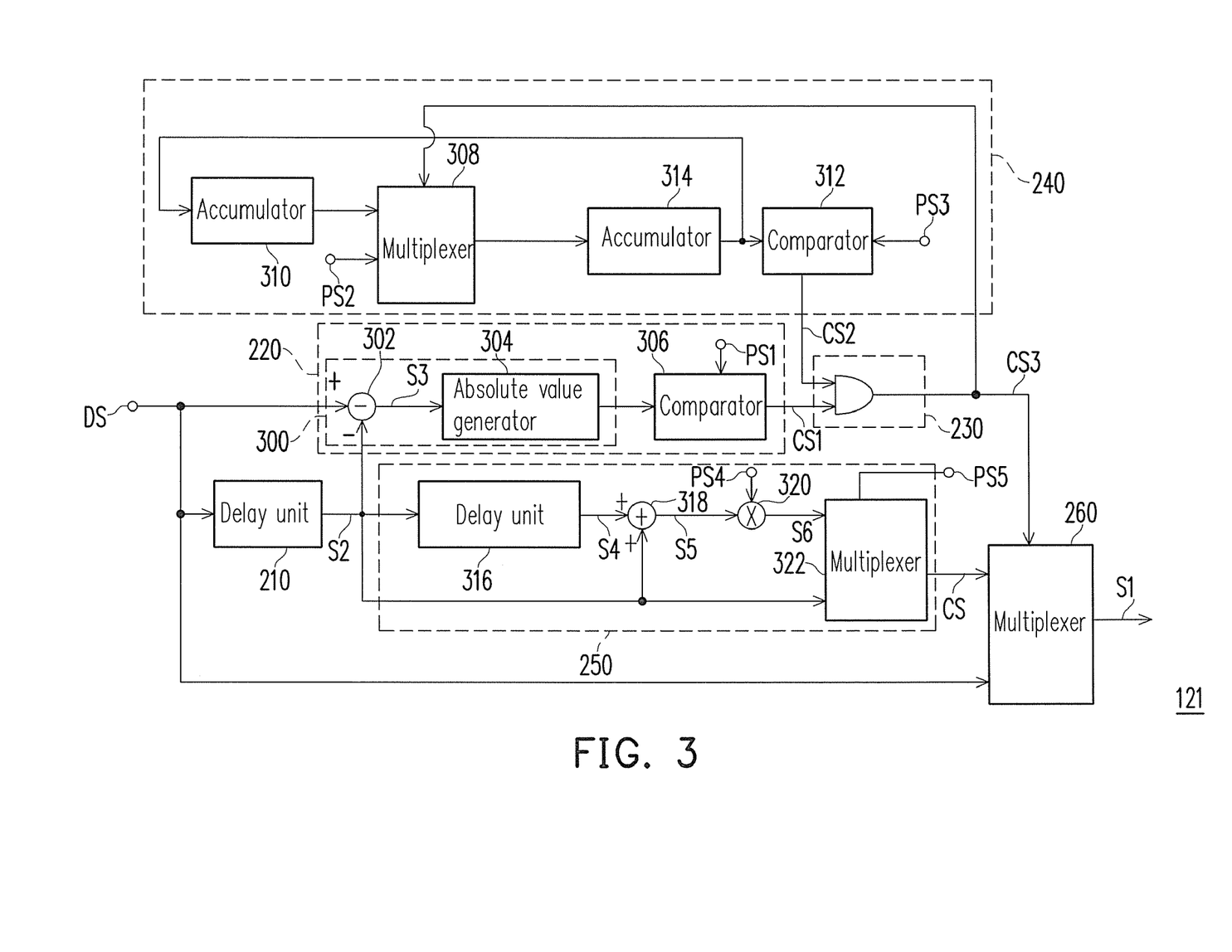
FIG. 3 is a block diagram illustrating the detailed circuit of the short impulse noise filter 121 in FIG. 2.

FIG. 3 is a block diagram illustrating the detailed circuit of the short impulse noise filter 121 in FIG. 2. Referring to FIG. 3, the noise inspector 220 includes a deviation calculator 300 and a comparator 306. The deviation calculator 300 is coupled to the delay unit 210 and it receives the digital signal DS and the signal S2 and performs a deviation calculation on the digital signal DS and the signal S2 to generate a variation. In other words, whether the digital signal DS contains any sample-based impulse noise can be determined according to the variation generated by the deviation calculator 300. In the present embodiment, the deviation calculator 300 further includes a calculation unit 302 and an absolute value generator 304. The calculation unit 302 coupled to the delay unit 210 receives the digital signal DS and the signal S2 and performs a calculation on the digital signal DS and the signal S2 to generate a signal S3. In the present embodiment, the calculation unit 302 is a subtractor which subtracts the signal S2 from the digital signal DS to generate the signal S3.

The absolute value generator 304 is coupled to the calculation unit 302 and it calculates an absolute value of the signal S3 to generate the variation. The comparator 306 coupled to the absolute value generator 304 receives and compares the variation and a predetermined value PS1 to generate the control signal CS1. For example, the comparator 306 asserts the control signal CS1 when the variation is greater than the predetermined value PS1, and the comparator 306 de-asserts the control signal CS1 when the variation is smaller than the predetermined value PS1. In the present embodiment, the predetermined value PS1 can be determined according to the actual requirement.

Referring to FIG. 3 again, the selection unit 240 includes a multiplexer 308, an accumulator 310, a register 314, and a comparator 312. As described above, the selection unit 240 is used for setting a window such that the short impulse noise filter 121 can operate (compensate signal) within this specific window.

The accumulator 310 is coupled to the multiplexer 308 and it accumulates an output value outputted from the register 314 to generate a counting value. In the present embodiment, the accumulator 310 accumulates the output value of the register 314 through the counting-up method. It is noted that the register 314 may be removed, and the accumulator 310 accumulates an output value outputted from the multiplexer 314 to generate a counting value in this case.

The multiplexer 308 coupled to the output of the calculation unit 230 receives a predetermined value PS2, the counting value, and the control signal CS3 and selects one of the predetermined value PS2 and the counting value as the output value according to the state of the control signal CS3. For example, the multiplexer 308 selects the predetermined value PS2 as the output value when the control signal CS3 is de-asserted, and the multiplexer 308 selects the counting value as the output value when the control signal CS3 is asserted. In the present embodiment, the predetermined value PS2 can be determined according to the actual requirement.

The comparator 312 is coupled to a register 314, and it receives and compares the output value with a predetermined value PS3 to determine whether to assert the control signal CS2. For example, the comparator 312 asserts the control signal CS2 when the output value is smaller than the predetermined value PS3, and the comparator 312 de-asserts the control signal CS2 when the output value is greater than the predetermined value PS3. In the present embodiment, the predetermined value PS3 can be determined according to the actual requirement, and the asserted period of the control signal CS2 can be controlled by adjusting the predetermined value PS3.

Herein it should be noted that the predetermined value PS3 is used for setting aforementioned window. Assuming the predetermined value PS2 to be 0 and the predetermined value PS3 to be 5, the operation window of the short impulse noise filter 121 contains five digital signals DS (corresponding to five pixels).

Referring to FIG. 3 again, when the short impulse noise filter 121 is initialized, the control signal CS2 is 0, and accordingly the multiplexer 308 selects the predetermined value PS2 (assumed to be 0) as the control signal CS2 and sends the predetermined value PS2 to the comparator 312. Then, the control signal CS2 is changed to 1 because the predetermined value PS3 has a greater value.

Foregoing initial situation is changed once the control signal CS1 is changed into 1. As described above, the control signal CS1 being 1 means that the noise inspector 220 detects a short impulse noise. Accordingly, the control signal CS3 is also changed to 1. Then the control signal CS3 is determined to be the counting value outputted from the accumulator 310. When the counting value increases until it reaches the predetermined value PS3=5, the control signal CS2 is changed to 0 so that the control signal CS3 is 0 too. As a result, the signal compensation of the short impulse noise filter 121 is stopped and the selection unit 240 is reset.

It should be noted that as described above, the selection unit 240 is used for setting a specific window such that the short impulse noise filter 121 can filter out the short impulse noise within the specific window. Since a specific window (a line section of a specific length), such as foregoing five pixels, is set, the short impulse noise filter 121 only filters short impulse noises out of these five pixels.

Referring to FIG. 3 again, the compensation unit 250 includes a delay unit 316, calculation units 318 and 320, and a multiplexer 322. The delay unit 316 is coupled to the delay unit 210 and receives and delays the signal S2 to generate a signal S4.

The calculation unit 318 is coupled to the delay units 210 and 316 for performing a calculation on the signal S2 and the signal S4 to generate a signal S5. In the present embodiment, the calculation unit 318 is an adder, namely, the calculation unit 318 adds the signal S2 and the signal S4 to generate the signal S5.

The calculation unit 320 is coupled to the calculation unit 318 for performing a calculation on the signal S5 and a predetermined value PS4 to generate a signal S6. In the present embodiment, the calculation unit 320 is a multiplier, namely, the calculation unit 320 multiplies the signal S5 by the predetermined value PS4 to generate the signal S6. Besides, the predetermined value PS4 can be determined according to the actual requirement. In the present embodiment, the predetermined value PS4 is determined to be 0.5 such that the signal S6 is an average value of previous two digital signals.

The multiplexer 322 is coupled to the delay unit 210 and the calculation unit 320 and selects one of the signal S2 and the signal S6 as the compensation signal CS according to the state of a predetermined value PS5. For example, the multiplexer 322 selects the signal S2 as the compensation signal CS when the predetermined value PS5 is asserted, and the multiplexer 322 selects the signal S6 as the compensation signal CS when the predetermined value PS5 is de-asserted. In the present embodiment, the predetermined value PS5 can be determined according to the actual requirement.

Figure 4:
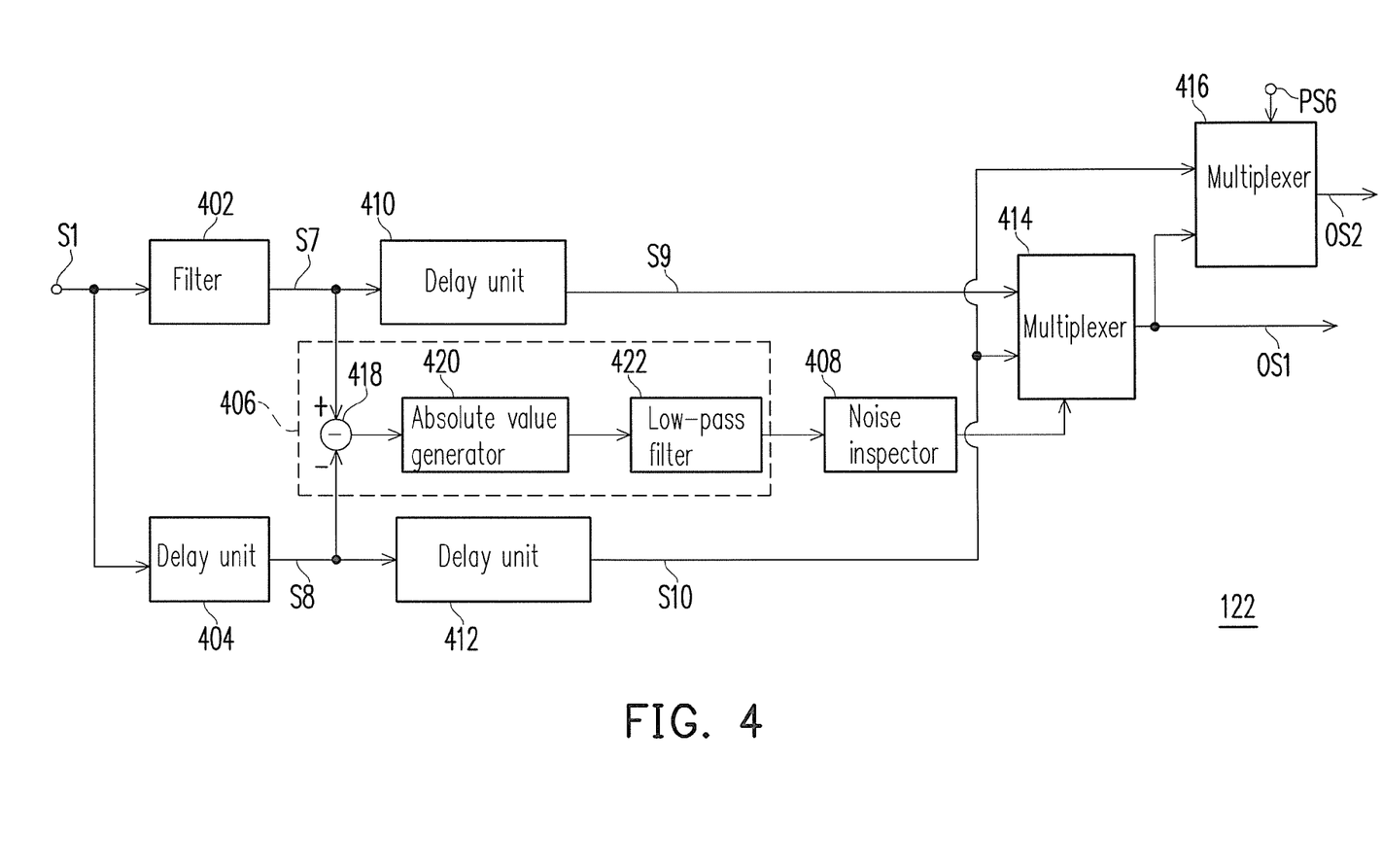
FIG. 4 is a block diagram of a long impulse noise filter 122 according to an embodiment of the present invention.

FIG. 4 is a block diagram of a long impulse noise filter 122 according to an embodiment of the present invention. Referring to FIG. 4, the long impulse noise filter 122 includes a filter 402, delay units 404, 410, and 412, a deviation generator 406, a noise inspector 408, and a multiplexer 414.

The filter 402 receives and filters the signal S1 to generate a signal S7. The filter 402 is a median filter which is used for filtering out long impulse noise. Namely, if the signal S1 contains long impulse noise, the median filter will filter out the long impulse noise.

The delay unit 404 receives and delays the signal S1 to generate a signal S8. The deviation generator 406 is coupled to the filter 402 and the delay unit 404 and which receives the signals S7 and S8 and performs a calculation on the signals S7 and S8 to generate a first deviation.

The noise inspector 408 coupled to the deviation generator 406 inspects the first deviation and generates an inspection result. The delay unit 410 coupled to the filter 402 receives and delays the signal S7 to generate a signal S9 (i.e., the median of the delayed signal S1). The delay unit 412 coupled to the delay unit 404 receives and delays the signal S8 to generate a signal S10 (i.e., the delayed signal S1).

The multiplexer 414 is coupled to the delay units 410, 412 and the noise inspector 408, and the multiplexer 414 is used to select one of the signals S9 and S10 as an output signal OS1 according to the inspection result. For example, the multiplexer 414 selects the filtered signal S9 as the output signal OS1 when the inspection result is asserted (a line-based impulse noise is detected in the signal S1), and the multiplexer 414 selects the signal S10 as the output signal OS1 when the inspection result is de-asserted (no line-based impulse noise is detected in the signal S1).

Additionally, the long impulse noise filter 122 further includes a multiplexer 416. The multiplexer 416 is coupled to the multiplexer 414 and the delay unit 412 for selecting one of the signal S10 and the output signal OS1 as an output signal OS2 according to a predetermined value PS6. In the present embodiment, the predetermined value PS6 can be determined according to the actual requirement.

As shown in FIG. 4, the output signal OS1 is sent to the synchronous timing decoder 140 in FIG. 1 so that the video data decoder 130 and a next-level circuit (not shown) can process video data according to the output signal OS1. The output signal OS2 in FIG. 4 can be sent to the video data decoder 130 in FIG. 1 to provide the video data to the video data decoder 130 and the next-level circuit (not shown).

The deviation generator 406 includes a calculation unit 418 and an absolute value generator 420. The calculation unit 418 performs a calculation on the signals S7 and S8 to generate a first calculation result. In the present embodiment, the calculation unit 418 is a subtractor, namely, the calculation unit 418 subtracts the signal S8 from the signal S7 to generate the first calculation result. The absolute value generator 420 calculates an absolute value of the first calculation result to generate the first deviation.

Additionally, the deviation generator 406 further includes a low-pass filter 422. The low-pass filter 422 is coupled between the absolute value generator 420 and the noise inspector 408 for averaging several first deviations.

As described above, the long impulse noise filter 122 inspects the signal S1 and determines the output signal OS1 to be the delayed signal S1 or a median of the delayed signal S1 according to the inspection result, so as to filter out the second noise portion of the signal S1. Besides, in the present embodiment, the long impulse noise filter 122 further determines the output signal OS2 to be the output signal OS1 or the signal S1 according to a predetermined value (for example, the predetermined value PS6 in FIG. 4).

It should be noted herein that the output signal OS1 generated by the long impulse noise filter 122 is sent to the synchronous timing decoder 140, while the output signal OS2 is sent to the video data decoder 130. Accordingly, the video data decoder 130 decodes the output signal OS2 to generate the desired image data, and the synchronous timing decoder 140 decodes the output signal OS1 to generate the desired timing signal. Because the noises in the digital signal DS have been filtered out by the signal noise filter device 120, the quality of the digital signal DS is effectively improved and accordingly image distortion can be avoided in the video device 100.

It should be noted herein that the output signal OS1 represents a timing signal, and if the timing signal is incorrectly decoded, the error produced in the video image is much more serious than that the error produced when the image data is incorrectly decoded. Even though in the present embodiment, the video data decoder 130 receives the output signal OS2 outputted from the long impulse noise filter 122, the present invention is not limited thereto. In an actual application of the present invention, the long impulse noise filter 122 may generate only the output signal OS1, and the video data decoder 130 may directly receive the digital signal DS outputted from the ADC 110 and the timing signal outputted from the synchronous timing decoder 140. Such variation is also within the scope of the present invention.

Figure 5:
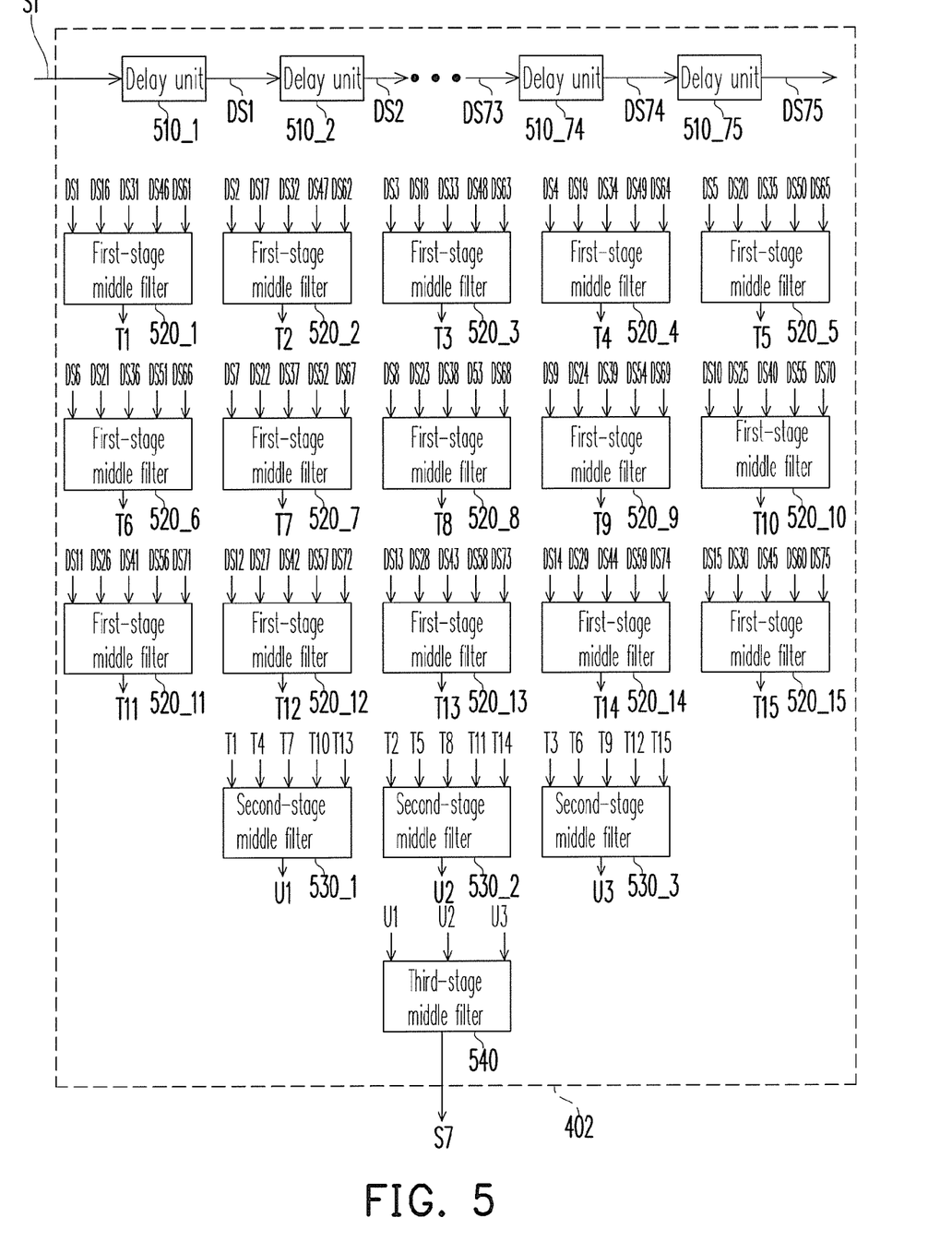
FIG. 5 illustrates an example of how a filter 402 generates a signal S7 according to an embodiment of the present invention.

Below, how the filter 402 generates the signal S7 will be described with an example; however, the present invention is not limited to this example. FIG. 5 illustrates the example of how the filter 402 generates the signal S7 according to an embodiment of the present invention. Referring to FIG. 5, first, it is assumed that the filter 402 includes three stage middle filters, and the signal S1 received by the filter 402 is delayed by 75 delay units 510_1~510_75 so as to generate 75 delay signals DS1~DS75 respectively. After that, the delay signals DS1~DS75 are sequentially sent to 15 first-stage middle filters 520_1~520_15, and the sequence thereof may be: the delay signal DS1 is sent to the first first-stage middle filter 520_1, the delay signal DS2 is sent to the second first-stage middle filter 520_2, . . . , the delay signal DS15 is sent to the fifteenth first-stage middle filter 520_15, the delay signal DS16 is sent to the first first-stage middle filter 520_1, the delay signal DS17 is sent to the second first-stage middle filter 520_2, . . . , the delay signal DS30 is sent to the fifteenth first-stage middle filter 520_15, . . . , and the delay signal DS75 is sent to the fifteenth first-stage middle filter 520_15.

Next, the first-stage middle filters 520_1~520_15 respectively capture the medians of the received delay signals DS1~DS75 and generate 15 different medians T1~T15. Thereafter, the medians T1~T15 are sequentially sent to 3 second-stage middle filters 530_1~530_3, and the sequence thereof is: the median T1 is sent to the first second-stage middle filter 530_1, the median T2 is sent to the second second-stage middle filter 530_2, the median T3 is sent to the third second-stage middle filter 530_3, the median T4 is sent to the first second-stage middle filter 530_1, . . . , the median T6 is sent to the third second-stage middle filter 530_3, . . . , and the median T15 is sent to the third second-stage middle filter 530_3. Then, the second-stage middle filters 530_1~530_3 respectively capture the medians of the received medians T1~T15 and generates three different medians U1~U3.

Eventually, the medians U1~U3 are sent to the third-stage middle filter 540. The third-stage middle filter 540 captures the median of the medians U1~U3 to generate an output result (i.e., the seventh signal S7 in FIG. 4). Through the operation of the filter 402, the second noise portion (the line-based impulse noise) in the signal S1 can be effectively filtered out. Accordingly, the output signal OS1 is made more accurate and image distortion can be avoided in the video device 100.

Figure 6:
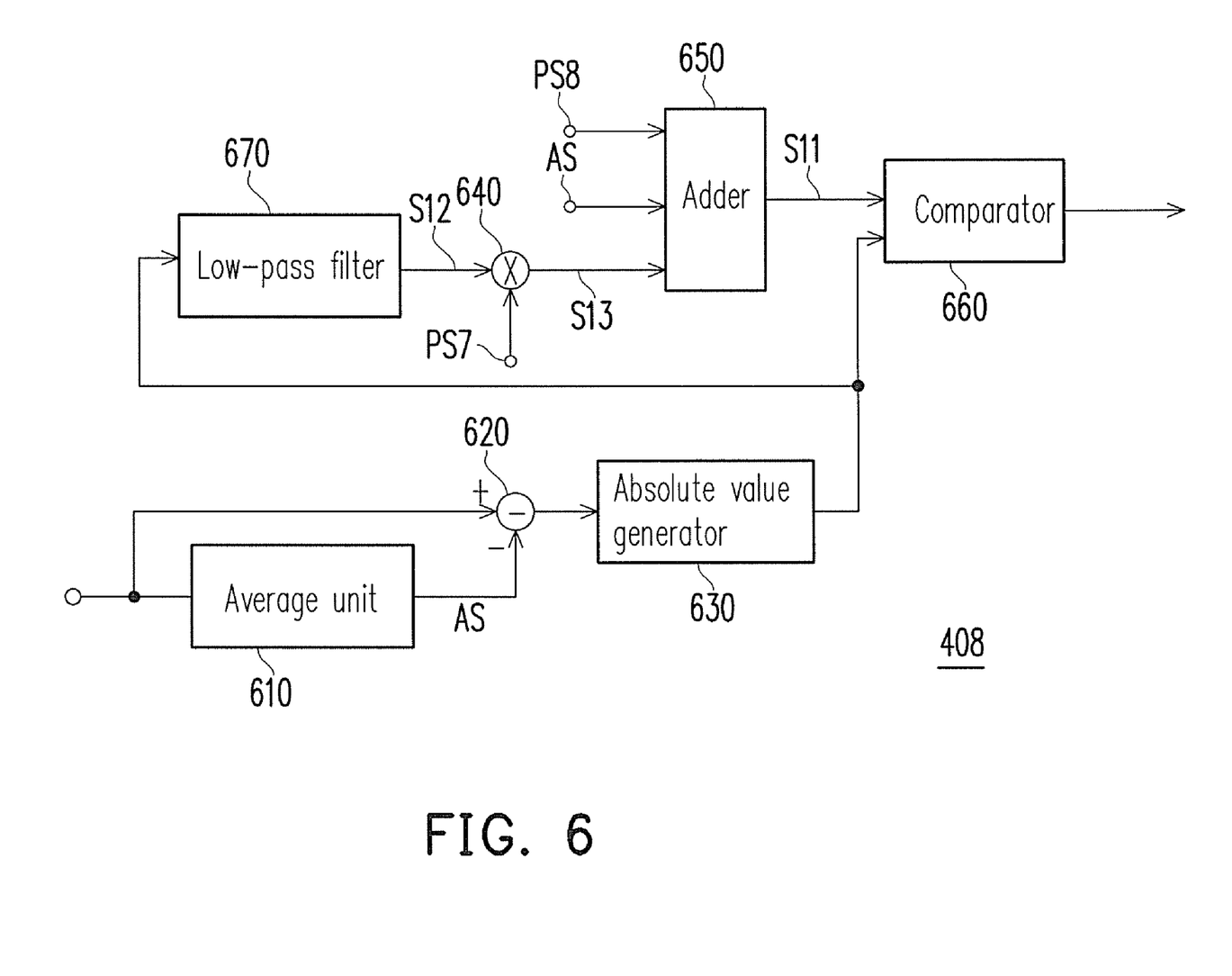
FIG. 6 is a block diagram of a noise inspector 408 in FIG. 4.

FIG. 6 is a block diagram of the noise inspector 408 in FIG. 4. Referring to FIG. 4, the noise inspector 408 includes an average unit 610, a subtractor 620, an absolute value generator 630, a multiplier 640, an adder 650, a comparator 660, and a low pass filter 670.

The average unit 610 receives and averages the first deviation to generate an average value AS. The subtractor 620 receives the first deviation and the average value AS and performs a subtraction on the first deviation and the average value AS to generate the second calculation result. The absolute value generator 630 coupled to the subtractor 620 calculates an absolute value of the second calculation result to generate a second deviation.

A low-pass filter 670 is coupled to the absolute value generator 630 for averaging several second deviations and generating a signal S12. The multiplier 640 coupled to the low-pass filter 670 multiplies the signal S12 by a predetermined value PS7 to generate a signal S13.

Thereafter, the adder 650 adds the signal S13, the average value AS outputted from the average unit 610, and a predetermined value PS8 to generate a signal S11.

It should be noted herein that the predetermined values PS7 and PS8 can be determined according to the actual requirement. In other words, the signal S11 is a user-defined dynamic threshold, and the value thereof is determined by the values of foregoing parameters (the predetermined values PS7 and PS8). The low-pass filter 670, the multiplier 640, and the adder 650 can be considered as a dynamic threshold generator.

Finally, the comparator 660 compares the second deviation with the dynamic threshold S11 to generate an inspection result. For example, the comparator 660 asserts the inspection result to indicate that a line-based impulse noise is detected when the second deviation is greater than the dynamic threshold S11, and the comparator 660 de-asserts the inspection result when the second deviation is smaller than the dynamic threshold S11.

Figure 7:
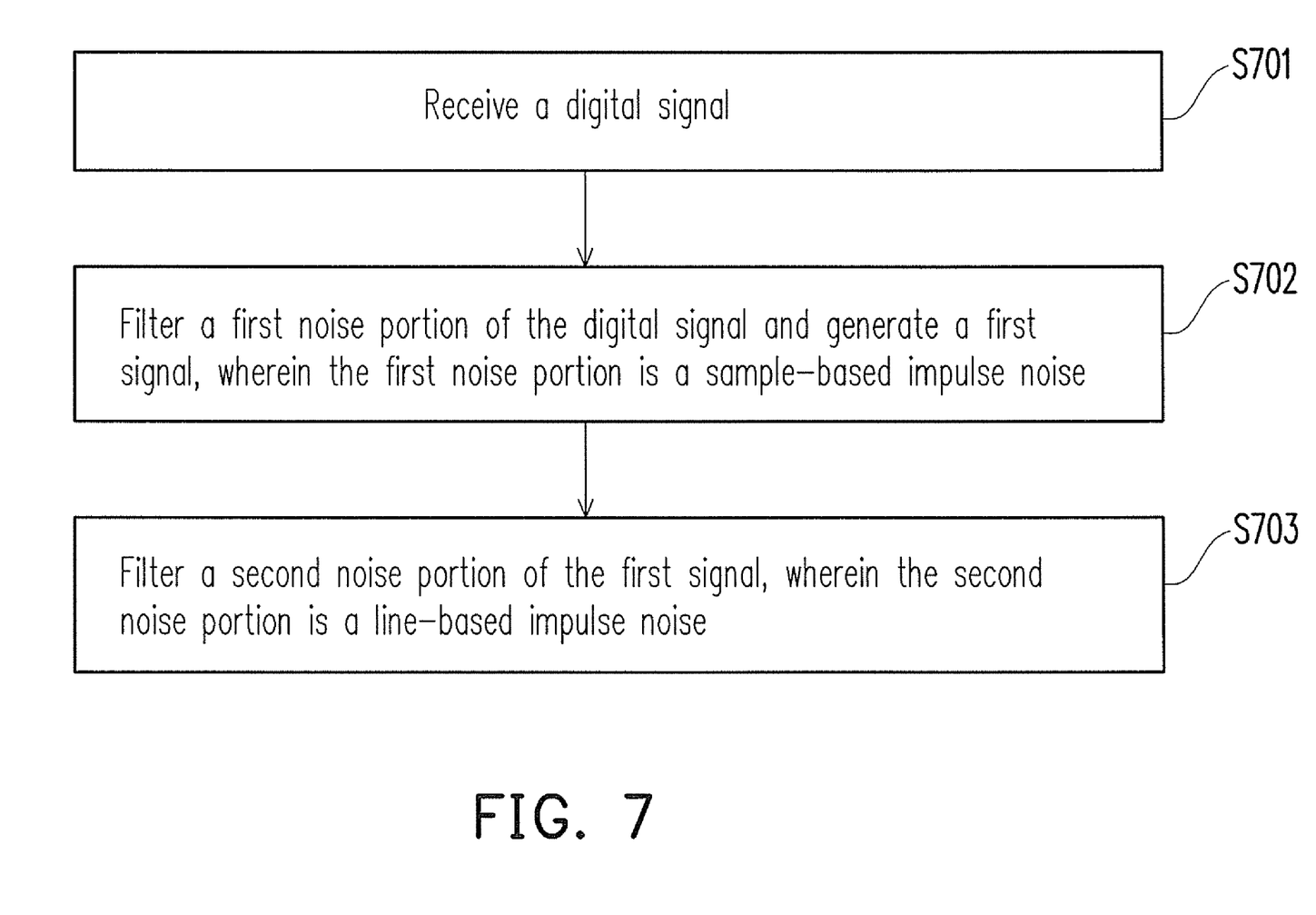
FIG. 7 is a flowchart of a method for filtering signal noise according to an embodiment of the present invention.

A method for filtering noise in an image signal can be obtained through the embodiments described above. FIG. 7 is a flowchart of the signal noise filtering method according to an embodiment of the present invention. Referring to FIG. 7, first, in step S701, an image signal is received and converted into a digital signal. Then, in step S702, a first noise portion of the digital signal is filtered to generate a first signal. The method for filtering the first noise portion of the digital signal in step S702 includes following steps. First, the digital signal is inspected to generate a first inspection result. Then, a compensation signal is generated according to the digital signal. Next, the first signal is determined to be the compensation signal or the digital signal according to the first inspection result.

Thereafter, in step S703, a second noise portion of the first signal is filtered, wherein the first noise portion is a sample-based impulse noise, and the second noise portion is a line-based impulse noise. The method for filtering out the second noise portion of the first signal in step S703 includes following steps. First, the first signal is inspected to generate a second inspection result. Then, the first output signal is determined to be the delayed first signal or a median of the delayed first signal according to the second inspection result.

As described above, in the present invention, a first noise portion (a sample-based impulse noise) and a second noise portion (a line-based impulse noise) in a digital signal are respectively filtered out by using a first filter and a second filter. Thereby, the quality of the digital signal can be effectively improved and accordingly image distortion the noise-carrying digital signal will not be sent to a next-level circuit to be processed and accordingly signal distortion in subsequent signal processing carried out by a next-level circuit can be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for filtering noise in an image signal, comprising:
    an analog-to-digital converter (ADC), for receiving the image signal and converting the image signal into a digital signal;
    a first filter, for receiving the digital signal and filtering a first noise portion of the digital signal to generate a first signal, inspecting the digital signal to generate a first inspection result, generating a compensation signal according to the digital signal, and determining the first signal to be the compensation signal or the digital signal according to the first inspection result, wherein the first filter comprises:
        a first delay unit, for receiving and delaying the digital signal to generate a second signal;
        a first noise inspector, coupled to the first delay unit, for receiving and inspecting the digital signal and the second signal to generate a first control signal;
        a first calculation unit, coupled to the first noise inspector, for receiving the first control signal and a second control signal and performing a calculation on the first control signal and the second control signal to generate a third control signal;
        a selection unit, coupled to the first calculation unit, for determining whether to assert the second control signal according to a state of the third control signal;
        a compensation unit, coupled to the first delay unit, for compensating the second signal to generate the compensation signal; and
        a first multiplexer, coupled to the compensation unit and the first calculation unit, for selecting one of the digital signal and the compensation signal as the first signal according to the state of the third control signal, wherein the third control signal is corresponding to the first inspection result; and
    a second filter, coupled to the first filter, for receiving the first signal and filtering a second noise portion of the first signal;
    wherein the first noise portion is a sample-based impulse noise, and the second noise portion is a line-based impulse noise.

2. The apparatus according to claim 1, wherein the first noise inspector comprises:
    a deviation calculator, coupled to the first delay unit, for receiving the digital signal and the second signal and performing a deviation calculation on the digital signal and the second signal to generate a variation; and
    a first comparator, coupled to a first absolute value generator, for comparing the variation with a first predetermined value to generate the first control signal.

3. The apparatus according to claim 2, wherein the deviation calculator comprises:
    a second calculation unit, coupled to the first delay unit, for receiving the digital signal and the second signal and performing a calculation on the digital signal and the second signal to generate a third signal; and
    a first absolute value generator, coupled to the second calculation unit, for calculating an absolute value of the third signal to generate the variation.

4. The apparatus according to claim 3, wherein the second calculation unit is a subtractor.

5. The apparatus according to claim 1, wherein the selection unit sets a window, and the first filter operates within the window.

6. The apparatus according to claim 1, wherein the selection unit comprises:
    a second multiplexer, coupled to the first calculation unit, for receiving a second predetermined value, a counting value, and the third control signal and selecting one of the second predetermined value and the counting value as an output value according to the state of the third control signal;
    an accumulator, coupled to the second multiplexer, for accumulating an output value of the second multiplexer to generate the counting value; and
    a second comparator, coupled to the second multiplexer, for receiving the output value and a third predetermined value and comparing the output value with the third predetermined value to determine whether to assert the second control signal.

7. The apparatus according to claim 6, wherein the selection unit further comprises:
    a register, coupled between the second multiplexer and the second comparator, for latching the output value outputted from the second multiplexer.

8. The apparatus according to claim 1, wherein the compensation unit comprises:
    a second delay unit, coupled to the first delay unit, for receiving and delaying the second signal to generate a fourth signal;
    a third calculation unit, coupled to the first delay unit and the second delay unit, for performing a calculation on the second signal and the fourth signal to generate a fifth signal;
    a fourth calculation unit, coupled to the third calculation unit, for performing a calculation on the fifth signal and a fourth predetermined value to generate the sixth signal; and
    a third multiplexer, coupled to the first delay unit and the fourth calculation unit, for selecting one of the second signal and the sixth signal as the compensation signal according to a state of a fifth predetermined value.

9. The apparatus according to claim 8, wherein the third calculation unit is an adder, and the fourth calculation unit is a multiplier.

10. The apparatus according to claim 1, wherein the first calculation unit is an AND gate.

11. The apparatus according to claim 1, wherein the second filter inspects the first signal to generate a second inspection result and determines a first output signal to be a delayed first signal or a median of the delayed first signal according to the second inspection result.

12. The apparatus according to claim 11, wherein the second filter comprises:
a third filter, for receiving and filtering the first signal to generate a seventh signal, wherein the third filter is a median filter;
a third delay unit, for receiving and delaying the first signal to generate an eighth signal;
a deviation generator, coupled to the third filter and the third delay unit, for receiving the seventh signal and the eighth signal and performing a calculation on the seventh signal and the eighth signal to generate a first deviation;
a second noise inspector, coupled to the deviation generator, for inspecting the first deviation to generate an inspection result;
a fourth delay unit, coupled to the third filter, for receiving and delaying the seventh signal to generate a ninth signal;
a fifth delay unit, coupled to the third delay unit, for receiving and delaying the eighth signal to generate a tenth signal; and
a fourth multiplexer, coupled to the fourth delay unit, the fifth delay unit, and the second noise inspector, for selecting one of the ninth signal and the tenth signal as the first output signal according to the inspection result.

13. The apparatus according to claim 12, wherein the second filter further comprises:
a fifth multiplexer, coupled to the fourth multiplexer and the fifth delay unit, for selecting one of the tenth signal and the first output signal as a second output signal according to a sixth predetermined value.

14. The apparatus according to claim 12, wherein the deviation generator comprises:
a fifth calculation unit, for performing a calculation on the seventh signal and the eighth signal to generate a first calculation result; and
a second absolute value generator, for calculating an absolute value of the first calculation result to generate the first deviation.

15. The apparatus according to claim 14, wherein the fifth calculation unit is a subtractor.

16. The apparatus according to claim 14 further comprising:
a first low-pass filter, coupled between the second absolute value generator and the second noise inspector, for averaging the first deviation.

17. The apparatus according to claim 12, wherein the second noise inspector comprises:
an average unit, for receiving and averaging the first deviation to generate an average value;
a subtractor, for receiving the first deviation and the average value and performing a subtraction on the first deviation and the average value to generate a second calculation result;
a third absolute value generator, coupled to the subtractor, for calculating an absolute value of the second calculation result to generate a second deviation;

a dynamic threshold generator, coupled to the third absolute value generator, for processing the second deviation to generate an eleventh signal; and
a third comparator, coupled to the third absolute value generator and the dynamic threshold generator, for comparing the second deviation and the eleventh signal to generate the inspection result.

18. The apparatus according to claim 17, wherein the dynamic threshold generator comprises:
a second low-pass filter, coupled to the third absolute value generator, for averaging the second deviation to generate a twelfth signal;
a multiplier, coupled to the second low-pass filter, for performing a multiplication on the twelfth signal and a seventh predetermined value to generate a thirteenth signal; and
an adder, coupled to the multiplier, for performing an addition on the thirteenth signal, an eighth predetermined value, and the average value to generate the eleventh signal.

19. A method for filtering noise in an image signal, comprising:
receiving an image signal, and converting the image signal into a digital signal;
filtering a first noise portion of the digital signal, and delaying the digital signal to generate a second signal;
generating a first control signal according to the digital signal and the second signal;
receiving the first control signal and a second control signal, and performing a calculation on the first control signal and the second control signal to generate a third control signal,
determining whether to assert the second control signal according to a state of the third control signal,
compensating the second signal to generate a compensation signal;
selecting one of the digital signal and the compensation signal as a first signal according to the state of the third control signal; and
filtering a second noise portion of the first signal;
wherein the first noise portion is a sample-based impulse noise, and the second noise portion is a line-based impulse noise.

20. The method according to claim 19, wherein the step of filtering the first noise portion of the digital signal comprises:
inspecting the digital signal to generate a first inspection result;
generating a compensation signal according to the digital signal; and
determining the first signal to be the compensation signal or the digital signal according to the first inspection result.

21. The method according to claim 19, wherein the step of filtering the second noise portion of the first signal comprises:
inspecting the first signal to generate a second inspection result; and
determining a first output signal to be a delayed first signal or a median of the delayed first signal according to the second inspection result.

* * * * *